United States Patent [19]

Andersson et al.

[11] 4,119,774

[45] Oct. 10, 1978

[54] HEPARIN PURIFICATION METHOD

[75] Inventors: Lars-Olov Andersson, Knivsta; Erik Yngve Holmer, Bromma, both of Sweden

[73] Assignee: AB Kabi, Stockholm, Sweden

[21] Appl. No.: 773,504

[22] Filed: Mar. 2, 1977

[51] Int. Cl.² .......................................... A61K 31/725
[52] U.S. Cl. .................................................. 536/21
[58] Field of Search ........................................ 536/21

[56] References Cited

U.S. PATENT DOCUMENTS 2,623,001  12/1952  Sylven et al. .......................... 536/21

FOREIGN PATENT DOCUMENTS 1,195,010  6/1965  Fed. Rep. of Germany ............. 536/21

*Primary Examiner*—Johnnie R. Brown
*Assistant Examiner*—Blondel Hazel
*Attorney, Agent, or Firm*—A. A. Orlinger

[57] ABSTRACT

Crude clinically used heparin preparations having a low specific activity, for example, about 130 heparin units per milligram are purified by contacting such liquid crude heparin preparations with a gel matrix complexed with (i.e. having linked to it) antithrombin or inter-alpha-trypsin inhibitor as a heparin-binding plasma protein, and then desorbing or eluting the heparin from the antithrombin or inter-alpha-trypsin inhibitor complexed gel matrix as with an applicable buffer, removing any salt in the solution with the heparin by gel filtration and then drying the heparin as by lyophilization.

11 Claims, No Drawings

HEPARIN PURIFICATION METHOD

This invention is that of a method for purifying heparin, characterized by its providing resulting very pure heparin possessing high specific activity. Heparin, used in medical treatment for several decades, is one of the best known blood anticoagulants, and has been in extensive use, e.g., to prevent thrombosis.

Heparin of a very high degree of purity and specific activity is provided by the method of the invention as a simple procedure readily applicable for commercial use to provide heparin of greater specific activity than is available with existing heparin preparations.

The sulfated polysaccharide heparin can be derived from animal intestinal mucus or the lungs by comparatively complicated methods. As a result, the heparin preparations currently used clinically contain material having a great variation in molecular size, namely, from about 5,000 to about 35,000. Its specific activity usually is about 130 heparin units per mg., as determined according to Denson and Bonnar (1975, British Journal of Hematology, volume 30 page 139).

Thus, the currently available commercial heparin preparations are quite heterogenous. The frequency of side effects in heparin therapy is rather low. However, where side effects do occur, they often present severe problems. Some of these side effects probably are caused by impurities in the heparin preparations. Therefore, there is a good incentive for providing purer, more specifically active heparin preparations than those currently in use.

In connection with studies of antithrombin, a cofactor of heparin, the possibilities of binding the antithrombin protein to a gel matrix were investigated. Surprisingly, it was found that the gel matrix-bound antithrombin could specifically bind the molecule fraction of therapeutically used heparin, which fraction acts as a carrier of the clinically valuable, thrombose-prophylactic effect of heparin.

With suitably applied adsorption and desorption conditions, an extraordinarily pure heparin was prepared. The improved specific activities of the purified heparin preparations thus obtained were 200 to 270 units/mg. as compared with approximately 130 units/mg. as that of the starting crude heparin material. The distribution of molecular weights in the thus specifically purified heparin is far more limited than that in the starting crude heparin-bearing material.

It also surprisingly was found that in place of the heparin cofactor antithrombin, the currently used low specific activity heparin preparations can be purified by instead of complexing the gel matrix with adsorbed heparin cofactor antithrombin, linking it with the inter-α-trypsin inhibitor (having a molecular weight of about 150,000, and obtained as a side fraction during isolation of coagulation factor IX, i.e. B-factor, L.-O. Andersson et al., Thromb Res vol. 7, 1975, pp. 451–459). The inter-α-trypsin inhibitor thus also is a heparin-binding plasma protein.

Thus, instead of using the gel matrix complexed with the heparin-binding plasma protein antithrombin, the crude starting low specific activity heparin preparations can be purified by the method of the invention by using the gel matrix complexed with the inter-α-trypsin inhibitor. However, by using in the method the gel matrix-bound antithrombin, thus far the best quality of heparin preparations was obtained, i.e. with specific activities up to 270 units per mg.

Considered broadly, the invention is that of a method for providing purified heparin preparations having enhanced specific activity such as significantly in excess of a low specific activity of about 130 heparin units per milligram and up to a specific activity of from about 200 to at least about 270 heparin units per milligram of heparin preparation. The method comprises the essential step of (a) contacting a water-insoluble gel matrix complexed with adsorbently bound antithrombin or inter-α-trypsin inhibitor with a starting low specific activity heparin preparation, thereby to bind the heparin to the gel matrix-bound antithrombin or gel matrix-bound inter-α-trypsin inhibitor, and (b) separating, i.e. desorbing, the heparin from the gel matrix-heparin-binding plasma protein complex.

Illustrative of the water-insoluble gel matrix are the SEPHAROSE 4B beads (product of Pharmacia Fine Chemicals, Piscataway, New Jersey, and Uppsala, Sweden). These are a beaded agarose gel prepared by allowing 4% aqueous solution of agarose to gel in bead form.

The following examples illustrate, without limiting, the invention:

EXAMPLE 1 — PURIFICATION OF HEPARIN BY GEL-MATRIX-BOUND ANTITHROMBIN (COLUMN PROCEDURE)

The gel-matrix adsorbent was prepared by initial activation followed by linking or complexing with the antithrombin.

Activation: 3 g. of cyanogen bromide (CNBr) was dissolved in 30 ml. of distilled water. 50 ml. of settled agarose beads was added to the aqueous CNBr-solution. The mixture was cooled on an icebath with stirring. The pH was raised to 11.2 by adding 4 M NaOH and kept constant for 10 minutes. The resulting activated gel matrix then was washed with cold distilled water and 0.2 M NaHCO$_3$.

Linking: 200 mg. of antithrombin (purified according to Mills-Andersson et al., 1974, Thromb Res, vol. 5 pp. 439–452) was dissolved in 50 ml. 0.2 M NaHCO$_3$ (pH 9.0) and added to the activated gel matrix. The activated gel matrix suspension in this antithrombin solution was gently stirred at room temperature overnight and then carefully washed alternatively with buffer of high ion strength of pH range from 7.0 to 9.0, e.g. 0.2 M NaHCO$_3$ + 1.5 M NaCl (pH 8.0), and then of low pH range from 4.0 to 6.0, as 0.1 sodium acetate-acetic acid, 1 M NaCl (pH 5.0).

Purification of Heparin: The resulting gel matrix adsorbent with thus bound antithrombin was packed in a column and equilibrated with 0.05 M Tris, 0.15 M NaCl, pH 7.4 buffer. 300 mg. of heparin (from A/B Vitrum, Stockholm, Sweden) of specific activity 130 units/mg. was dissolved in 20 ml. 0.05 M Tris, 0.15 M NaCl, pH 7.4 buffer, and the resulting solution was pumped through the column.

Thereafter, the resulting gel matrix with bound antithrombin-bound heparin was washed with the above-mentioned buffer and the adsorbed heparin then was desorbed by pumping through the column an aqueous 0.05 M Tris, 1.0 M NaCl, pH 7.4 buffer.

The sodium chloride was removed from the eluted heparin by gel filtration in distilled water in a column packed with SEPHADEX G25 (bead form dextran gel maxtrix prepared by cross-linking selected dextran fractions with epichlorohydrin, product of Pharmacia, supra). Thereafter the salt-free remaining aqueous heparin was lyophilized.

The thus dried purified heparin showed a specific activity of 270 units/mg. Studies of the distribution of molecular weights show that it has a considerably more limited molecular weight distribution than had the starting crude primary heparin. Carbohydrate analysis was made by the carbazole-$H_2SO_4$ method.

EXAMPLE 2 — PURIFICATION OF HEPARIN ON MATRIX-BOUND ANTITHROMBIN (BATCH PROCEDURE)

The gel matrix-bound antithrombin was prepared as in Example 1.

Purification Of Heparin: 500 mg. heparin (from A/B Vitrum, supra) of specific activity 130 units/mg. was dissolved in 300 ml. of 0.05 M tris, 0.15 M NaCl, pH 7.4 buffer. 300 ml. of settled gel matrix-bound antithrombin was equilibrated in the above-mentioned buffer and suction-dried. The resulting adsorbant was added to the heparin solution, and the suspension then was stirred at room temperature for an hour. The gel was suction-dried on a glass filter and washed with 10 × 200 ml. of 0.05 M Tris 0.15 M NaCl, pH 7.4 buffer.

The adsorbed heparin was then desorbed from the gel matrix-bound antithrombin-bound heparin by 3 × 200 ml. 0.05 M. Tris, 1.0 M NaCl, pH 7.4 buffer. The eluted heparin was concentrated by freeze-drying. The remaining salt was removed by gel filtration on SEPHADEX G25 in distilled water, and the heparin then was lyophilized. The specific activity of the thus purified heparin was 250 units/mg.

EXAMPLE 3 — PURIFICATION OF HEPARIN ON GEL MATRIX ADSORBENT CONTAINING MATRIX-BOUND INTER-ALPHA-TRYPSIN INHIBITOR

Preparation of gel matrix adsorbent: 250 mg. of the inter-alpha-trypsin inhibitor (mol. wt. about 150,000, obtained as earlier above described in purification of B-factor) was dissolved in 200 ml. of a 0.2 M $NaHCO_3$ (pH 9.0) buffer and this solution then was added to 50 ml. of settled SEPHAROSE 4B activated with CNBr by the procedure described in Example 1. This suspension of activated gel matrix with bound inter-alpha-trypsin inhibitor was gently stirred at room temperature overnight. Then the resulting gel matrix-bound inter-α-trypsin inhibitor was washed in the same way as were the corresponding gel matrix-antithrombin beads of Example 1.

Purification of heparin: The gel matrix containing bound inter-α-trypsin inhibitor was packed in a column. 300 mg. heparin (Vitrum, supra) was dissolved in 20 ml. of a 0.05 M Tris, 0.15 M NaCl, pH 7.4 buffer and pumped through the column. The resulting gel matrix with bound inter-α-trypsin inhibitor-bound heparin then was washed with the above-mentioned buffer and the adsorbed heparin then was desorbed with a 0.05 M Tris, 1.0 M NaCl pH 7.4 buffer. The salt was removed from the heparin by gel filtration on SEPHADEX G25 in distilled water and the heparin then was dried by lyophilization. The specific activity of the thus purified heparin was 230 units/mg.

The method of the invention, in its contacting the activated water-insoluble gel matrix with the heparin-binding plasma protein adsorbent in any suitable manner, such as exemplified in Examples 1 to 3, can provide significantly purified heparin preparations of specific activity even well beyond 270 units/mg. although with decreasing yield at such higher range beyond the 270 units/mg.

The presently indicated commercial most practical production range of heparin purity by the method of the invention is that with activity from about 200 to 270 units/mg.

The cyanogen bromide used in Example 1, while preferred for activating the water-insoluble gel matrix, can be replaced by another of the cyanogen halides.

While the invention has been explained by the foregoing detailed description of certain specific embodiments of it, it is to be understood that various substitutions or modifications may be made in any of them within the scope of the appended claims which are intended also to cover equivalents of any of the disclosed embodiments.

What is claimed is:

1. A method for purifying a crude heparin preparation to provide a heparin preparation of enhanced heparin specific activity, which method comprises the combination of steps of (a) contacting the starting heparin preparation with a water-insoluble gel matrix having adsorbently bound to it a heparin-binding plasma protein selected from antithrombin and inter-α-trypsin inhibitor to provide a gel matrix with adsorbently bound said plasma protein and the heparin bound thereto, and (b) separating the heparin from said gel matrix having said heparin-binding plasma protein bound to it.

2. The method as claimed in claim 1, wherein antithrombin is the heparin-binding plasma protein bound to the gel matrix.

3. The method as claimed in claim 1, wherein inter-alpha-trypsin inhibitor is the heparin-binding plasma protein bound to the gel matrix.

4. The method as claimed in claim 1, wherein the water-insoluble gel matrix is the beaded agarose gel prepared by having an about 4% aqueous solution of agarose in bead form.

5. The method as claimed in claim 4, wherein said agarose gel beads are activated by activation treatment with a cyanogen halide.

6. The method as claimed in claim 5, wherein the cyanogen halide is cyanogen bromide.

7. The method as claimed in claim 1, wherein the initial contact between the starting heparin preparation and the gel matrix with said adsorbently bound plasma protein is conducted by feeding said heparin preparation dissolved in a compatible aqueous buffer solution through a column packed bed of said gel matrix.

8. The method as claimed in claim 1, wherein the initial contact between the starting heparin preparation and the gel matrix with said adsorbently bound plasma protein is conducted by admixing said heparin preparation dissolved in a compatible buffer solution with said gel matrix.

9. The method as claimed in claim 1, wherein said heparin is separated from said gel matrix having the heparin bound to the gel matrix with heparin-binding plasma protein bound to it, by desorbing the heparin therefrom by elution with an aqueous solution containing about one-half percent of sodium chloride dissolved in it.

10. The method as claimed in claim 9, wherein sodium chloride in the separated heparin is removed therefrom by gel filtration.

11. The method as claimed in claim 1, wherein the separated heparin is dried by lyophilization.

* * * * *

UNITED STATES PATENT AND TRADEMARK OFFICE
CERTIFICATE OF CORRECTION

PATENT NO. : 4,119,774
DATED : October 10, 1978
INVENTOR(S) : Lars-Olov Andersson & Erik Yagve Holmer It is certified that error appears in the above-identified patent and that said Letters Patent are hereby corrected as shown below:

In the first column of the identification page, between the items [22] and [51] there should appear:

[30]    Foreign Application Priority Data

March 5, 1976    Sweden    7603040

Signed and Sealed this

Twelfth Day of June 1979

[SEAL]

Attest:

RUTH C. MASON
Attesting Officer

DONALD W. BANNER
Commissioner of Patents and Trademarks